United States Patent [19]

Liberto et al.

[11] Patent Number: 4,832,356
[45] Date of Patent: May 23, 1989

[54] SPLASH GUARD DEFLECTOR

[76] Inventors: Samuel J. Liberto, 429 Parker St., Verona, Pa. 15147; Eugene J. Berardi, 6882 Alcoma Dr., Penn Hills, Pa. 15235

[21] Appl. No.: 430,334

[22] Filed: Sep. 30, 1982

[51] Int. Cl.⁴ .............................................. B62D 25/16
[52] U.S. Cl. .................................................. 280/851
[58] Field of Search ..................... 280/154.5 R, 152 R, 280/153 A, 154.5 A, 156, 157, 159

[56] References Cited

U.S. PATENT DOCUMENTS

| | | | |
|---|---|---|---|
| 2,559,755 | 7/1951 | Bratz | 280/152 R |
| 2,605,119 | 7/1952 | Earnest | 280/153 R |
| 2,619,363 | 11/1952 | Wenham | 280/154.5 R |
| 2,831,702 | 4/1958 | Eaves | 280/152 R |
| 2,940,773 | 6/1960 | Eaves | 280/154.5 R |
| 3,088,751 | 5/1963 | Barry | 280/154.5 R |
| 3,279,818 | 10/1966 | Jones | 280/154.5 R |
| 3,726,544 | 4/1973 | Miller | 280/154.5 R |

*Primary Examiner*—John J. Love
*Assistant Examiner*—Michael Mar
*Attorney, Agent, or Firm*—Arnold B. Silverman

[57] ABSTRACT

This invention relates to a universal splash guard deflector for use with a vehicle in the vicinity of the vehicles wheels. The deflector in use is positioned behind a vehicle wheel in respect of the vehicles primary direction of travel. The splash guard deflector is comprised of a planar central portion defined by upper and lower edge regions, as well as inside and outside edge regions. The upper edge region is adapted to be secured to a portion of the vehicle.

A splash deflecting element is integrally secured to the planar central portion along a line equidistant to one of the edge regions. A plurality of openings are disposed along the equidistant line to thereby allow for the passage of air due to vehicle movement in the primary direction of travel. The splash deflecting element is configured such that a semi-fluid medium driven by the vehicle wheel will strike the central planar portion and travel along the planar portion towards the edges and thence be redirected by the splash deflecting element in a downward and forward manner to thereby minimize splashing of the medium outside of a vehicle path defined by the vehicles primary direction of travel.

5 Claims, 2 Drawing Sheets

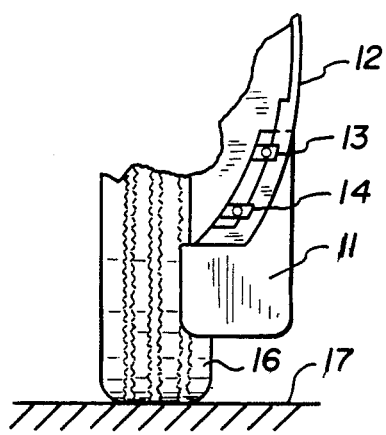
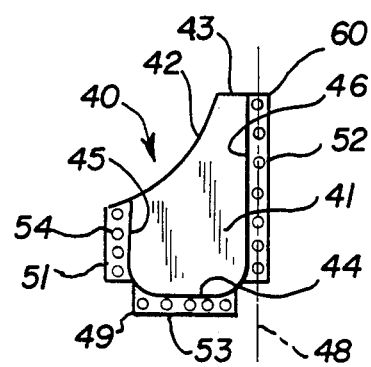
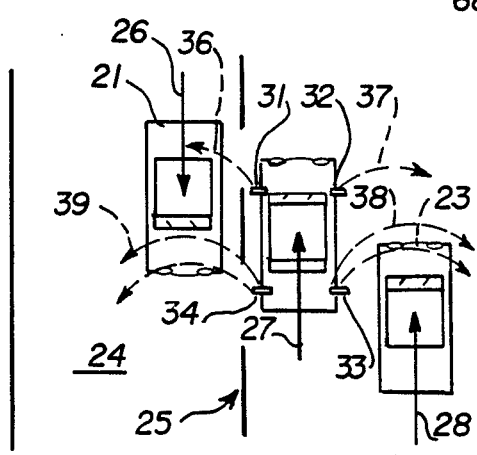
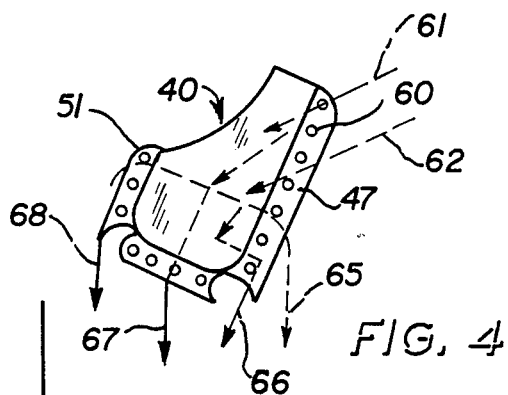
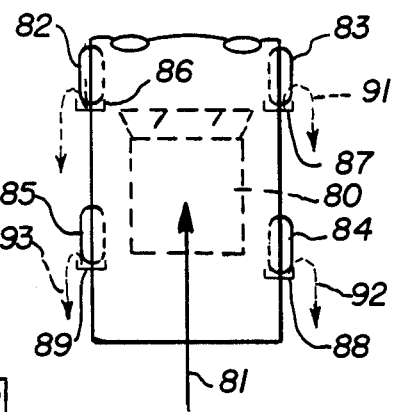
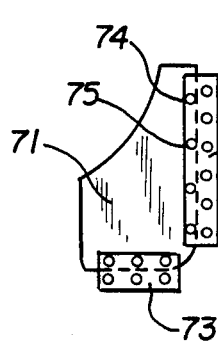

SPLASH GUARD DEFLECTOR

TECHNICAL FIELD

This invention relates to a splash guard deflector for use with a vehicle in the vicinity of the vehicle wheels.

BACKGROUND OF THE INVENTION

Since the earliest days of motor driven vehicles there has been an on going primary concern in respect of the vehicles wheels splashing moisture ladden materials on the roadway onto the vehicle. A secondary concern has been the desire to keep the splashed material or semi-fluid medium from being driven by vehicle wheels onto other vehicles using the highway. In the case of trucks and trucks pulling trailers, the laws of many states require that there be provided a downwardly projecting barrier to prevent the splashing or the throwing of stones lodged between double sets of wheels.

In the early days of motor driven vehicles when dirt roadways were more common than paved, the aforementioned splash problem was treated by the use of mud flaps. Over the years devices intended to correct splash problems have been variously termed, "fender extensions", "tire spray shields", "splash guards" and as noted above, "mud flaps".

Typical of an early effort in this technical area of concern is the fender extension of W. G. Bratz, U.S. Pat. No. 2,559,755. The primary concern of Bratz is to provide a fender guard constructed and arranged to protect the fender and body surfaces against splashing and the like by the vehicle wheel. Bratz does not entertain nor provide for, in his design, a splash guard that is primarily concerned with protecting other vehicles on the road from splashing as will be seen to be present in the invention to be described hereinafter.

The patent to Maxwell L. Earnest, U.S. Pat. No. 2,605,119 is a most significant contribution to the state-of-the-art in that Earnest provides a splash guard that surrounds the wheels of a truck and thereby prevents the wheels of the truck from throwing mud and water against passing or on-coming vehicles. The objective of Earnest identifies a problem which is solved by the invention to be described hereinafter by means of a splash guard deflector that is of a most elementary form and costing but a small fraction of the cost that would inherently be generated in the production of the Earnest splash guard.

Another good example of a splash guard for a truck is that shown and described in the patent to F. L. Wenham et al U.S. Pat. No. 2,619,363. This patent is directed to the manner and material utilized in the construction of a splash guard shown in FIGS. 1 to 5 of Wenham et al. It is of interest to note that the splash guard configuration of Wenham et al is of the type seen on the great majority of trucks today. It should be noted that Wenham et al recognizes that with flexible splash guards there is a tendency for the splash guards to be flexed by air moving there-against. To prevent flexing, Wenham et al provides openings 14 in the flap 1 along the upper edge to thereby allow passage of air as shown by arrows in FIG. 1 of Wenham et al.

The patent to W. C. Eaves, U.S. Pat. No. 2,940,773 provides a significant facet to the background prior art from which prior art the invention to be described is an advance. Eaves recognizes the problem of the conventional mud flaps acting as baffles that actually deflect stones laterally in the path of passing vehicles, and in severe rain storms the mud flaps intercept water throw from the tires creating a mist or cloud obscuring the vision of operators of passing vehicles. When the Eaves patent is studied, it will be appreciated that Eaves has merely provided a fender for a trailed vehicle, which fender when bolted in place acts much like a fender one would find on early vintage automobiles.

The L. A. Barry et al U.S. Pat. No. 3,088,751 is directed to a vehicle tire spray shield having an overall rectangular configuration when viewed from the rear as shown in FIG. 1. The Barry et al spray shield is a relatively complex device that includes louvers 38, a coarse screen 40, and spring biased rigid flap 42, all of which features no doubt enhance spray control at a cost to fabricate that is significantly greater than the universal splash guard deflector to be described hereinafter.

As the description of the invention to be set forth in the specification that follows unfolds, it will be keenly apparent that the invention is simpler in construction than Wenham et al, Eaves and Barry et al discussed above. In addition, the inventive principal which is dramatically present in the splash guard deflector allows the invention to be employed on both automobiles, as well as trucks, while the inventive contributions of Wenham et al, Eaves and Barry et al are limited in their use to trucks or truck and trailer combinations.

DISCLOSURE OF INVENTION

This invention, more specifically relates to a universal splash guard deflector for use with a vehicle in the vicinity of the vehicles wheels. The deflector in use is positioned behind a vehicle wheel in respect of the vehicles primary direction of travel. The splash guard deflector is comprised of a planar central portion defined by upper and lower edge regions, as well as inside and outside edge regions. The upper edge region is adapted to be secured to a portion of the vehicle.

A splash deflecting element is integrally secured to the planar central portion along a line parallel to one of the edge regions. A plurality of openings are disposed along the parallel line to thereby allow for the passage of air due to vehicle movement in the primary direction of travel. The splash deflecting element is configured such that a semi fluid medium driven by the vehicle wheel will strike the central planar portion and travel along the planar portion towards the edges and thence be redirected by the splash deflecting means in a downward and forward manner to thereby minimize splashing of the medium outside of a vehicle path defined by the vehicles primary direction of travel.

It is therefore a primary object of the invention to provide a universal splash guard deflector for use in both automobiles and trucks that is so constructed as to cause liquids and solids driven by the vehicles wheels against the deflector and then back towards and along side the vehicle wheel associated with the splash guard deflector.

Another object of the invention is to provide a splash guard deflector that is provided with a plurality of openings disposed along a line equidistant to an edge of a central planar portion of the splash guard, such that under dry conditions air passes through said openings thereby reducing drag, while during wet conditions, or when objects encountered on the road surface are driven by the vehicle wheels against the splash guard, the wetness from the road and the objects are caused to move past the openings and thereafter are directed towards the road surface.

In the attainment of the foregoing objects, the invention contemplates that the splash guard deflector for the vehicle will have a central planar portion and will be further defined by upper and lower edge regions, as well as what will be termed inside and outside edge regions. The lower edge region of the central planar region is substantially parallel to the roadway surface over which the vehicle travels. The upper edge region in the case of an automobile is secured to the auto's fender, and in the case of a truck/trailer, the upper edge region is secured to the truck/trailer frame. A splash deflecting element is integrally secured to the central planar portion along a line parallel to one of the edge regions. The splash deflecting element has a curved cross-sectional configuration and there are provided a plurality of openings disposed along the line that is equidistant from the central portion. These openings allow for the passage of air when the vehicle is traveling and therefor reduce drag. The invention contemplates that the inside, bottom and outside edge regions can each be provided with a splash deflecting element that has a curved cross-sectional configuration, as well as a plurality of openings disposed in the fashion noted above.

As has been noted earlier, the planar central portion, the plurality of openings, and the curved splash deflecting elements all cooperate to minimize splashing, solid object deflection and spraying outside of the path defined by the vehicles primary direction of travel.

Other objects and advantages of the present invention will be apparent upon reference to the accompanying description when taken in conjunction with the following drawings:

BRIEF DESCRIPTION OF DRAWINGS

FIG. 1 illustrates a prior art splash guard,

FIG. 2 depicts in schematic form vehicles traveling along a roadway with one of the vehicles equipped with prior art splash guards, FIG. 3 is a front view of a splash guard deflector that embodies the invention, FIG. 4 is a three-dimensional illustration of the splash guard deflector of FIG. 3, FIG. 5 is another embodiment of the invention, FIG. 6 is a schematic top view of a vehicle equipped with the splash guard deflectors that embody the invention.

BEST MODE FOR CARRYING OUT THE INVENTION

Figure 7:
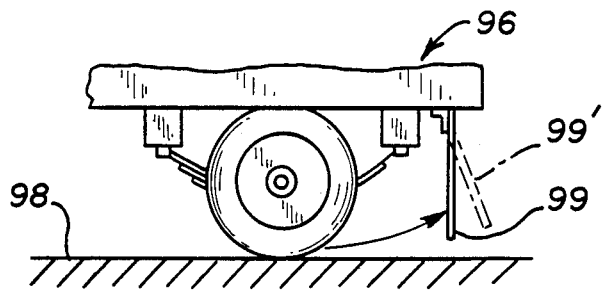
FIG. 7 is a partial section of a truck, and illustrates a typical prior art splash guard for such truck.

Reference is now made to FIG. 1 which is intended to show a typical prior art splash guard 11 secured to fender 11 by fasteners 13, 14. The splash guard 11 is positioned rearwardly or behind the vehicle wheel or tire 16, with the wheel 16 rolling on the pavement surface 17.

FIG. 2 is intended to illustrate a typical highway traffic pattern involving vehicles 21, 22 and 23. Vehicle 21 is headed in the direction indicated by arrow 26, while vehicles 22 and 23 are headed in the same direction as indicated by arrows 27 and 28. The roadway 24 is divided in the middle by center line stripes 25.

For purposes of illustration only, the vehicle 22 has shown schematically, conventional prior art splash guards 31, 32, 33 and 34, each of which are positioned behind the vehicles wheels, which wheels are not shown.

For purposes of the discussion that follows it is to be assumed that the roadway is partially covered with wet snow, cinders and salt, to create a semi-fluid medium which will be encountered by the vehicle wheels and driven back against the splash guards 31, 32, 33 and 34. This semi-fluid medium will then be deflected as shown by arrows 36, 37, 38 and 39 into the pathway of vehicles 21 and 23.

It would be a rare find in the northern latitudes to come upon a highway driver who has not at least once been completly blinded by the deflected semi-fluid medium from other vehicles using the roadway.

The invention now to be described substantially removes the vision blinding situation just described.

FIG. 3 represents a preferred embodiment of the splash guard deflector invention. In this embodiment the entire splash guard deflector 40 is of unitary construction and could be readily formed by injection molding. The invention also contemplates as being within its purview, the embodiments of FIG. 5, as well as FIG. 8, which embodiments will be explained in more detail hereinafter.

Returning now to FIG. 3 there is shown the splash guard deflector 40 which has a planar central portion 41 free of any openings therein to provide a central portion impervious to the passage there through of any elements in the environment through which the deflector passes. The planar central portion is, defined by an upper edge region 42, 43; a lower edge region 44; an inside edge region 45, and an outside edge region 46. For purposes of illustration only, the edge regions noted above are defined by solid lines on the surface of the splash guard deflector 40. These lines as shown in FIGS. 3 and 4 are ornamental and their presence in the respective figures further aid in the explanation of the construction and operation of the invention.

The upper edge region 42, 43 may be secured to a portion of the vehicle, such as, in the case of an automobile, the fender. The manner of attachment of the splash guard to the vehicle, whether by screw or clip fasteners, forms no part of the invention and for that reason is not shown.

The splash guard deflector 40 is provided with curved cross-sectional splash deflecting elements 47, 49, and 51, which elements are integrally secured to the planar central portion 41 along lines, such as, line 48, which lines are equidistant to one of the edge regions, which in the case of element 47 and line 48, is edge region 46.

It will be noted that in respect of element 47, there are a plurality of openings, such as opening 61 along said equidistant line 48. These openings which are also present in respect of deflecting elements 49 and 51 allow for the passage of air due to vehicle movement in the primary direction of the vehicles' travel.

Attention is now directed to FIG. 4 which is a three-dimensional of illustration of the invention shown in plan view in FIG. 3. In FIG. 4 the curved cross-sectional configuration of each of the deflecting elements 47, 49 and 51 are readily discernible.

An air flow arrow 60 is shown passing through opening 61. There is also depicted in FIG. 4, a number of broken line arrows. One of which is arrow 63, which arrow is intended to show the path of semi-fluid medium that is being directed from the vehicle wheel associated with the splash guard 40. Arrows 65, 66, 67 and 68 depict the ultimate path of the medium that has been directed by the vehicle wheel and strokes the planar central region 41. The arrow just noted, shows the medium traveling along the planar portion 41 towards the edge region whereafter it is redirected by the splash deflecting elements 47, 49 and 51 in a downward and forward manner to thereby minimize splashing of the medium outside of the vehicle path defined by the primary direction of travel of the vehicle.

It is to be understood that the splash guard deflector embodying the invention when used in combination with the fender of a vehicle, is mounted so that the lower edge region 44 is substantially parallel to the roadway or surface on which the wheels of the vehicle travel.

The splash guard deflector embodying the invention finds maximum utility in an automobile embodiment when the deflector is secured to a fender in a manner that allows a plane containing the central planar portion 41 to intersect at angles less than a right angle, the surface on which the vehicle is traveling.

It will of course be recognized that in a truck/trailer environment next to be described, the splash guard deflector of the invention is secured to the truck/trailer in a right angle attitude in respect to the roadway.

FIG. 5 depicts another embodiment of the invention which allows the use of a prior art splash guard modified to include deflecting elements 72, 73 integrally secured to a central planar portion 71 by means of fasteners 74, 75, such as metal screws, rivets, etc. Unreferenced openings in the deflecting elements 72, 73 are of course included.

In FIG. 6 a top view of a vehicle 80 is schematically illustrated to include a direction of travel arrow 81 and vehicle wheels 82, 83, 84 and 85. Associated with each of the just noted wheels are splash guard deflectors 86, 87, 88 and 89 that embody the invention. FIG. 6 is intended to demonstrate graphically the advantageous manner by which the medium (see arrows 90, 91, 92 and 93) is deflected in a downward and forward manner rather than into the pathway of other vehicles using the roadway.

FIG. 7 illustrates a portion of a truck/trailer environment, which includes a truck frame 96, wheel 97, roadway 98 and splash guard 99. The splash guard is also shown in a wind deflected position evidenced by broken lines 99'.

Figure 8:
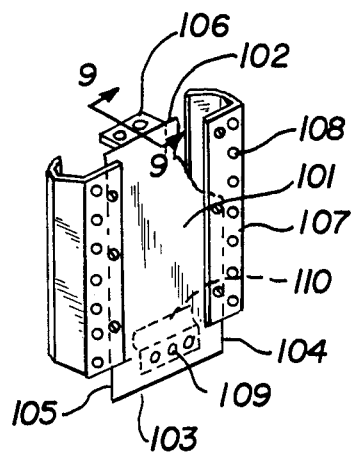
FIG. 8 is a three-dimensional illustration of yet another embodiment of the invention.
Figure 9:
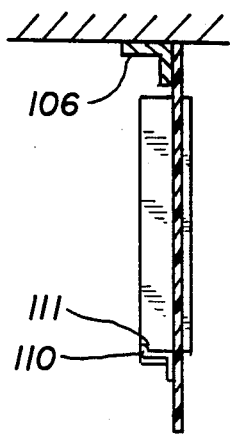
FIG. 9 is a sectional view taken along line 9—9 in FIG. 8.
Figure 10:
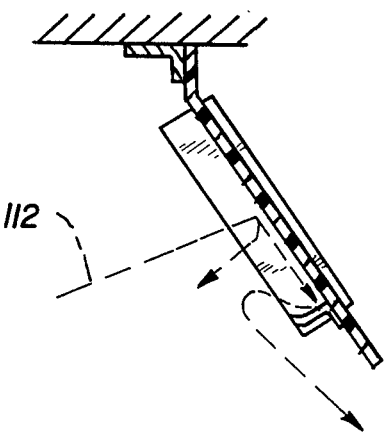
FIG. 10 is a sectional view similar to FIG. 9 with, however, the splash guard deflector embodying the invention shown in a deflected position.

FIG. 8 is yet another splash guard deflector 100 embodying the invention for use in combination with a truck/trailer. The splash guard deflector 100 has a planar central portion 101, upper edge region 102, lower edge region 103, inside edge region 104 and outside edge region 105. A vehicle frame sprocket 106 fashioned of angle iron secures the upper edge region 102 to the vehicle frame, not shown in this figure. A splash deflecting element 107 having openings, such as, opening 108 is secured to the planar central portion 101 by fasteners, shown but not referenced. The deflecting elements have curved cross-sectional configuration as can be seen in the drawing. The deflecting element 110 is shown in dotted outline in FIG. 8, and its curved cross-section 111 is shown in FIG. 9. FIG. 10 provides an illustration of the medium and the pathway of its movement which is indicated by arrow 112.

Although this invention has been illustrated and described in connection with the particular embodiments illustrated, it will be apparent to those skilled in the art that various changes may be made therein without departing from the spirit of the invention as set forth in the appended claims.

WE CLAIM:

1. A universal splash guard deflector for use with a vehicle in the vicinity of the vehicle's wheels, said deflector being positioned behind a vehicle wheel in respect of the vehicles primary direction of travel, said splash guard deflector comprised of
   a flat planar central portion free of any openings therein to provide a flat central portion impervious to the passage there-through of elements in the environment through which said deflector passes, said flat impervious central planar portion defined by upper and lower edge regions, as well as inside and outside edge regions,
   said upper edge region being adapted to be secured to a portion of said vehicle,
   a plurality of splash deflecting means each having a curved cross-sectional configuration, with each splash deflecting means integrally secured to said flat planar central portion along lines which are each respectively equidistant to said inside, outside and lower edge regions,
   a plurality of openings through said splash deflecting means, said openings disposed along said equidistant line to thereby allow for the passage of air and reduction of drag due to vehicle movement in said primary direction of travel, said splash deflecting means curved configuration being such that a semi-fluid medium driven by the vehicle wheel will strike said flat central planar portion which is free of openings and travel along said flat planar portion towards said edges past said openings and thence be redirected by said curved splash deflecting means in a downward and forward manner to thereby minimize splashing of said medium outside of a vehicle path defined by said vehicles primary direction of travel.

2. The splash guard deflector of claim 1 wherein said lower edge region of said planar central region is substantially parallel to a surface on which said wheels of said vehicle travel.

3. The splash guard deflector of claim 2 wherein said splash guard deflector is secured to said fender in such a manner that a plane containing said central planar portion intersects at an angle less than a right angle, a surface on which said vehicle is traveling.

4. The splash guard deflector of claim 2 wherein said planar central portion has an overall rectangular configuration.

5. The splash guard deflector of claim 4 wherein said splash guard deflector is secured at its upper edge region to a frame member of said vehicle to thereby allow said splash guard and deflector to assume a position at right angles to a surface over which said vehicle will travel when the vehicle is not in motion.

* * * * *